(12) United States Patent
Taneja et al.

(10) Patent No.: US 12,513,015 B1
(45) Date of Patent: Dec. 30, 2025

(54) AUTO-HEALING FOR BLOCKCHAIN CONFIGURATION DRIFTS

(71) Applicant: Bank of America Corporation, Charlotte, NC (US)

(72) Inventors: Pushkar Taneja, Hyderabad Telangana (IN); Suryanarayana Adivi, Hyderabad Telangana (IN); Shailendra Singh, Maharashtra (IN); Jemlin Lucas, Addison, TX (US)

(73) Assignee: Bank of America Corporation, Charlotte, NC (US)

( * ) Notice: Subject to any disclaimer, the term of this patent is extended or adjusted under 35 U.S.C. 154(b) by 64 days.

(21) Appl. No.: 18/757,652

(22) Filed: Jun. 28, 2024

(51) Int. Cl.
*H04L 9/00* (2022.01)

(52) U.S. Cl.
CPC ...................................... *H04L 9/50* (2022.05)

(58) Field of Classification Search
CPC ........... G06Q 20/4016; G06Q 10/0635; G06Q 2220/00; G06Q 30/0185; G06Q 30/0225; G06Q 30/0248; G06F 11/30; H04L 63/1441
See application file for complete search history.

(56) References Cited

U.S. PATENT DOCUMENTS

| 11,150,978 | B2 | 10/2021 | Safary et al. | |
| 12,009,070 | B1* | 6/2024 | Knas | G16H 10/60 |
| 2019/0230089 | A1* | 7/2019 | Xu | H04L 67/1042 |
| 2019/0311125 | A1* | 10/2019 | Mulgaonkar | G06F 21/572 |
| 2021/0241241 | A1* | 8/2021 | Lokanath | G06Q 20/065 |
| 2023/0050048 | A1* | 2/2023 | Chauhan | G06F 16/1837 |

OTHER PUBLICATIONS

Kevin Hartnett, "Finally, A Problem That Only Quantum Computers Will Ever Be Able To Solve," Quanta Magazine, Jun. 21, 2018.

* cited by examiner

*Primary Examiner* — Olugbenga O Idowu
(74) *Attorney, Agent, or Firm* — Weiss & Arons LLP

(57) ABSTRACT

A method for identifying configuration drifts in blockchain nodes and remediating the configuration drifts is provided. The method may include monitoring a plurality of nodes to identify a configuration drift to the required node configuration settings. In response to the monitoring, the method may include identifying a deviation between a current node configuration setting and the required node configuration settings. The method may include, in response to determining that an impact level of the configuration drift to the blockchain network is greater than a pre-determined threshold value, communicating with each of the plurality of nodes to temporarily isolate the node including the deviation pending a remediation of the configuration drift. Following the remediation, the method may include relinking an operation of the node to the blockchain network in increments by increasing, incrementally, the operation of the node from a first operational level to a target operational level.

20 Claims, 8 Drawing Sheets

AUTO-HEALING FOR BLOCKCHAIN CONFIGURATION DRIFTS

FIELD OF TECHNOLOGY

Aspects of the disclosure relate to systems and methods for maintaining security and reliability on blockchain networks. Specifically, aspects of the disclosure relate to auto-healing configuration drifts detected on a blockchain network.

BACKGROUND OF THE DISCLOSURE

Maintaining a secure and reliable blockchain network is essential for the success and stability of the blockchain. Configuration drifting on a blockchain node may lead to inconsistencies in the blockchain network. This may compromise the security and integrity of transactions being stored on the blockchain.

For the purposes of this application, a configuration drift may refer to fluctuations in configuration settings due to software updates, human error, malicious activity, clock synchronization issues or any other suitable issue. When a configuration drift occurs, it may result in data corruption, synchronization errors and vulnerability to attacks. The configuration drifts may cause nodes to diverge from the network protocol.

Therefore, it is desirable to have systems and methods for monitoring nodes on a blockchain network to identify configuration drifts and further to remediate the identified configuration drifts.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
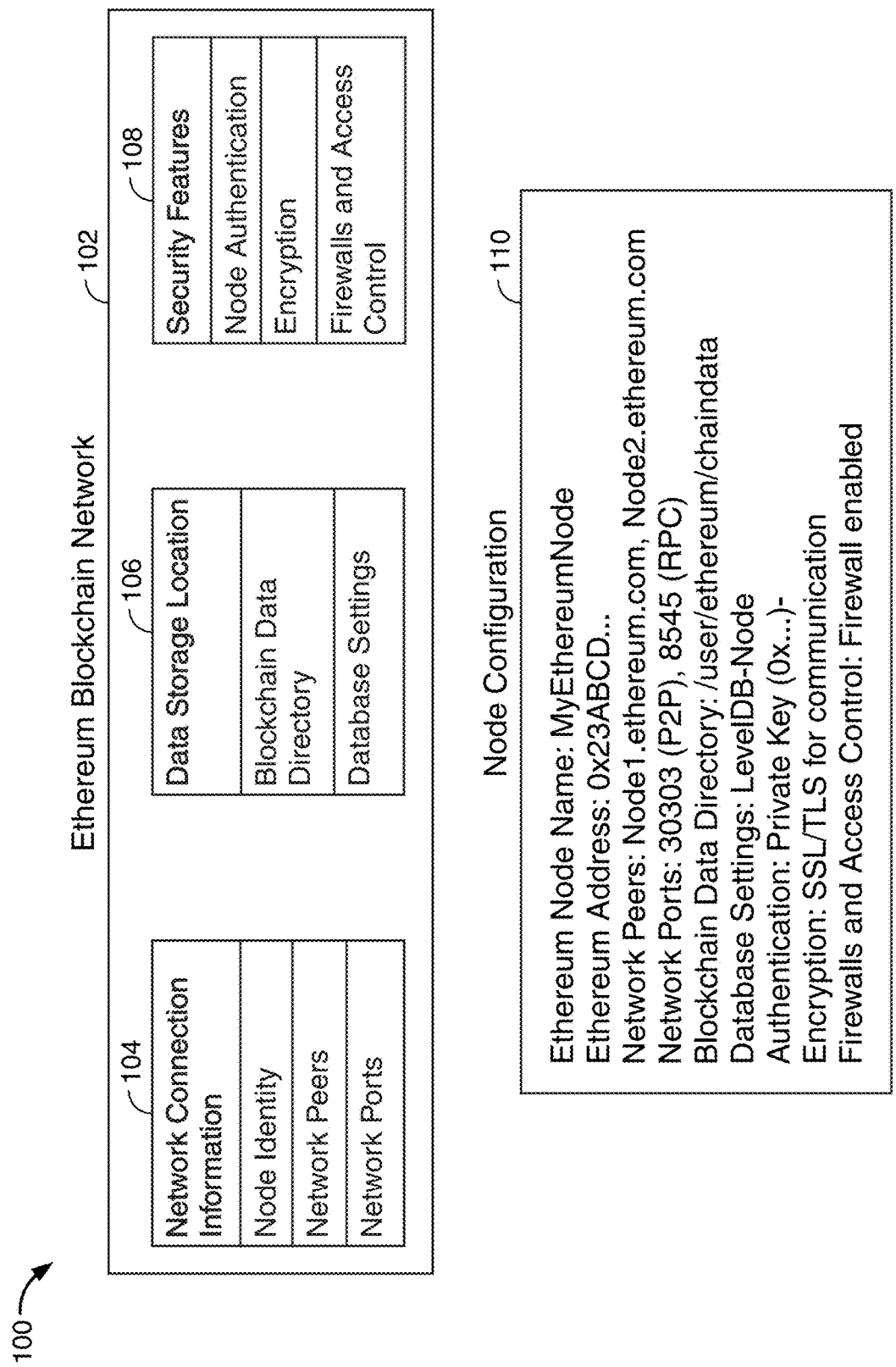
FIG. 1 shows an illustrative system architecture in accordance with principles of the disclosure.

A system for monitoring blockchain node activity for identifying configuration drifts occurring at one or more nodes is provided. The system may implement swarm-based identification for configuration drifts in blockchain nodes. The system may also implement neuro-symbolic AI algorithms to remediate the configuration drifts.

The system may include a blockchain network. The blockchain network may include a plurality of nodes in electronic communication.

Each node may include required node configuration settings. Node configuration settings may include node configuration data. The node configuration data may include a node name and a node address. Node configuration data may also include, for each node, blockchain network ports accessed by the node, a blockchain data directory of the node, node authentication, node encryption, firewalls running on the node, access control of the node and any other suitable node configuration data. Node configuration data may be a version number of one or more pieces of software running on the node, updates applied to node software or hardware, storage space available on the node, or any other suitable node data.

The system may include a trained monitoring model. The trained monitoring model may be a machine learning ("ML") model that may include pre-generated algorithms for identifying configuration drifts. The trained monitoring model may also be enabled to update and add newly generated algorithms to the model for subsequent monitoring.

The trained monitoring model may be configured to monitor activities at each of the plurality of nodes. The monitoring may be for identifying a possibility of a configuration drift to the node configuration settings for each node. The monitoring may continuously be executed whether a configuration drift is identified or not. A configuration drift may occur when one or more node settings for each node in the blockchain network drift from the initial setup.

The trained monitoring model may be configured to identify a configuration drift on a node. The configuration drift may be a deviation between current node configuration setting and the required node configuration settings. The configuration drift may be a difference between the required node configuration settings and the current node configuration settings.

It should be appreciated that the configuration drift of a blockchain node may be detected in response to failure to perform a software update on the node. In some embodiments, the configuration drift may be detected in response to a change in a node property of the node. In some embodiments, the configuration drift may be detected in response to a lack of clock synchronization between the node and the plurality of nodes.

For example, each node may have a firewall policy. The firewall policy may include a list of IP addresses that should be blocked from the blockchain network. If a transaction is received from an IP address included in the list, the transaction may not be retrieved. A configuration drift may occur when the IP address that is included in the list is enabled to join the blockchain. When a gap in the firewall policy is identified, the system may be enabled to auto-heal the deviation.

In another example, the time of a transaction may not be accurate. This may cause a configuration drift. Upon identifying the inaccuracy, the system may execute a remediation rule to automatically synchronize the timing of all nodes on the blockchain network.

In some embodiments, the system may leverage swarm intelligence to identify small changes, deviations in particular configuration settings or behavior of particular node and to further identify the behavior and if drifting is occurring there. The system may flag that node and update that specific area/node. Swarm intelligence may include a network of nodes that may be capable of generating and processing data at the source, i.e.—a central server. Relevant information that fits certain predetermined conditions can be shared immediately across the network, allowing individual nodes to process and act on input from their peers without being dependent on a central data lake.

Blockchain technology may enable nodes to share information and data in a trusted manner. This may provide useful data to the network without compromising the privacy and security of each node. Sharing of information from each node may increase a chance in detecting and identifying a configuration drift on one or more nodes prior to a point of compromising on the security of the node and of the blockchain network.

When a configuration drift is identified, the trained monitoring model may be configured to determine whether an impact level of the configuration drift to the blockchain network is greater than a pre-determined threshold value. The pre-determined threshold value may be assigned to the configuration drift by the training model based on a deviation between the required node configuration settings and the current node configuration settings. The impact level may be determined along a predetermined scale of values. The threshold value may be a selected one of the scale of values. The predetermined scale of values may be a scale of values that define the effect that the change in the setting(s) may cause to the functionality and security of each node and/or nodes on the blockchain network.

The impact level may correspond to a magnitude of the deviation between the current node configuration setting and the corresponding required node configuration setting. It should be appreciated that the greater the deviation, the greater the pre-determined threshold value may be.

In some embodiments, the magnitude of the deviation between a current node configuration setting and a required node configuration setting may be five percent or greater.

In some embodiments, the magnitude of the deviation between the current node configuration setting and the required node configuration setting is between five and ten percent or any other suitable metric and/or range of metrics.

When the deviation is lower than five percent, the configuration drift may not have any affecting impact to the node and/or the blockchain network. The configuration drift may not affect performance and activity occurring at the blockchain network.

When the impact level is greater than the pre-determined threshold value, the trained monitoring model may be configured to electronically communicate with each of the plurality of nodes to temporarily isolate the node that includes the deviation. The temporary isolation may include, in some embodiments, deleting any data received from the node.

Simultaneous to the temporary isolation, the trained monitoring model may be configured to execute a two-tier remediation routine to auto-heal the node and blocks stored on the node. The two-tier remediation routine may include a first tier for overwriting the current node configuration setting with the required node configuration setting. The overwriting may include resetting the current node configuration setting with the required node configuration setting. The overwriting may include performing one or more updates to the node to enable resetting the current node configuration setting and then further resetting the current node configuration setting with the required node configuration setting.

The one or more updates may include a clock synchronization, updating software to a most current updated software or any other suitable update.

The two-tier remediation routine may also include following the overwriting, executing a second tier for regenerating each block stored on the node, preferably during a predetermined time period, prior to the identifying of the configuration drift. The regenerating may include restoring the node configuration settings on each block to correspond to the overwritten current node configuration settings.

Following the execution of the two-tier remediation routine, the trained monitoring model may be configured to de-isolate the node. The de-isolating of the node may further include relinking the node to the blockchain network.

The relinking of the node to the blockchain network may include increasing, preferably by increments, an operation of the node from a first operational level to a target operational level. The first operational level may be an operational level of ten percent or any other suitable level. The first operational level may be within a range between ten percent and twenty percent operational level, or any other suitable percentage of range of operation of the node.

It should be noted that such an incremental increase, as described herein above, may serve to determine, in a time period and a reduced level of bandwidth consumption, a root cause of the configuration drift as well as a mitigation strategy relating thereto. This may further enable a detection of an onset of a configuration drift at an earlier state in the operation. Detecting the onset of the configuration drift at an earlier state may enhance the security and performance level of the blockchain network.

The incremental increase of operation of the node may be an increase of ten percent. The incremental increase of operation of the node may be an increase of twenty percent. The incremental increase of operation of the node may be an increase of thirty percent or any other suitable amount or within any suitable range.

The relinking may further include monitoring the node at the each incremented operational level to determine whether a configuration drift is occurring. The monitoring may continue for a predetermined time period following the de-isolating.

In the event that another configuration drift is identified at the node during the monitoring at an incremental level and the impact level is forecast to be greater than the predetermined threshold value, the system may be configured to permanently remove the node immediately from the blockchain network or reduce participation of the node in the blockchain network.

In some embodiments, the trained monitoring model may repeat the temporary isolating of the node and execute one or more remediation rules in an attempt to heal the node. The one or more remediation rules may be generated leveraging the neuro-symbolic AI model.

In some embodiments, when the node is de-isolated, the trained monitoring model may be further configured to monitor the node where the configuration drift is identified for a predetermined time period. In the event that another configuration drift is identified at the node, the trained monitoring model may, in some embodiments, be configured to permanently remove the node from the blockchain network.

When the impact level is less than the pre-determined threshold value, the trained monitoring model may be configured to monitor activity at the node. The monitoring may be a continuous monitoring. The monitoring may be a periodic monitoring.

In some embodiments each node may include an associated blockchain server. The blockchain server may include the trained monitoring model. The trained monitoring model may be configured to monitor the activity at the node for identifying the possibility of the configuration drift. Each trained monitoring model may monitor the associated node.

In some embodiments, each node may feed data to a central server. The data may include the current node configuration settings for each node transmitting data. Each node may iteratively transmit the current node configuration settings to the central server.

The trained monitoring model may be configured to evaluate the current node configuration settings for each node based on predefined criteria. The predefined criteria may include the required node configuration settings for each node. The predefined criteria may also include that the current node configuration settings are in synchronization with the current node configuration settings of the remaining nodes. The time the clock is set to on each node may be required to be in synch with the time the clock is set to on each of the remaining nodes.

When one or more current node configuration settings is a mismatch to the predefined criteria, the trained monitoring model may be configured to identify the mismatch as the configuration drift.

The system may leverage the configuration settings from each node for comparing to the other nodes in order to identify the configuration drifts.

When the mismatch is identified via the trained monitoring model, the central server may be configured to transmit an electronic communication to each node. The electronic communication may include a data packet. The data packet may include identifying data associated with the node comprising the mismatch and one or more instructions for executing at the one or more blocks that may have been added to the blockchain during a duration of time of the identifying of the mismatch.

It should be appreciated that the trained monitoring model may leverage a combination of the current node configuration settings from each node transmitted to the central server for identifying the mismatch. The trained monitoring model may use the particle swarm optimization ("PSO") model approach to proactively detect and mitigate configuration drifts and may further enhance the security and performance of blockchain networks.

When the overwriting fails to remediate the configuration drift, the trained monitoring model may be configured to execute the neuro-symbolic artificial intelligence ("AI") model to generate a remediation rule for the configuration drift. The generating may include analyzing the configuration drift using the neuro-symbolic AI model to determine a pattern leading to an onset of the configuration drift.

Based on the pattern leading to the onset, the method may include generating the remediation rule for detecting and remediating the configuration drift.

The pattern leading to the onset may be determined by comparing the current node configuration settings to the required node configuration settings during a pre-determined time window prior to the onset. Based on the comparing, the method may include determining the deviation between the current node configuration settings and the required node configuration settings. It should be appreciated that the deviation may cause the configuration drift.

The method may include identifying a trigger to a cause of the configuration drift. The configuration drift may be based on the deviation.

Based on the trigger, the method may include generating the remediation rule for detecting the trigger. The method may further include executing the remediation rule for remediating the configuration drift. The method may further include feeding the remediation rule to the trained monitoring model for subsequent monitoring and remediating.

The neuro-symbolic AI algorithm may further be configured to feed the algorithm to the training model for subsequent monitoring.

A method for detecting and remediating configuration drifts occurring in blockchain nodes is provided. The method may include implementing swarm-based identification of the configuration drifts in blockchain nodes and remediating the configuration drifts using neuro-symbolic artificial intelligence ("AI") algorithms.

The method may include monitoring activities at each of a plurality of nodes. The monitoring may be for identifying a possibility of a configuration drift occurring at a node. Each node may include corresponding required node configuration settings. Each node may be a part of a blockchain network.

In response to the monitoring, the method may include identifying a configuration drift on a node. The configuration drift may be a deviation between a current node configuration setting and the required node configuration setting.

The method may include determining whether an impact level of the configuration drift to the blockchain network is greater than a pre-determined threshold value. The pre-determined threshold value, or some other suitable metric, may be a percentage of negative impact that the configuration drift may be causing to the blockchain network. The configuration drift may cause a negative effect to the security and stability of the blockchain network.

In some embodiments, when the impact level is greater than the pre-determined threshold value, the method may include communicating electronically with each of the plurality of nodes to temporarily isolate the node that includes the deviation. In some embodiments, the temporary isolation may include deleting any data received from the node.

The method may further include, when the impact level is greater than the pre-determined percentage, executing a two-tier remediation routine to auto-heal the node and blocks stored on the node. The two-tier remediation routine may include a first tier of the remediation routine including overwriting the current node configuration setting with the required node configuration setting. The method may further include executing the second tier of the remediation routine including, following the overwriting, restoring each block stored on the node during a predetermined time period prior to the identifying of the configuration drift.

When the impact level is less than the pre-determined threshold value, the method may include continuously monitoring activity at the node.

The method may further include, when an additional configuration drift is identified at the node where the configuration drift is healed, the method may include removing the node from the blockchain network.

It should be appreciated that when the impact level is less than the predetermined threshold or percentage, the method may include continuously performing a monitoring of activity at the node.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an exemplary blockchain network 100. Blockchain network 100, in this exemplary diagram, may be an Ethereum blockchain network. The blockchain network may include a plurality of nodes associated with the blockchain network.

Each node may include one or more of the node configuration settings shown at 102. Node configuration settings for nodes in the blockchain may include network connection information 104 which may include node identity, network peers and network ports. Node configuration settings 102 may also include data storage location 106. Data storage location 106 may include blockchain data directory and database settings. Node configuration settings 102 may also include security features 108. Security features 108 may include node authentication, encryption and firewalls and access control.

Node configuration table 110 may be an example of specific configuration settings of a single node. Such settings include a name of the node, an IP address, network peers associated with the node and one or more network ports. Such settings may further include a blockchain data directory, database settings, type(s) of authentication, encryption, firewalls and access control settings.

Figure 2:
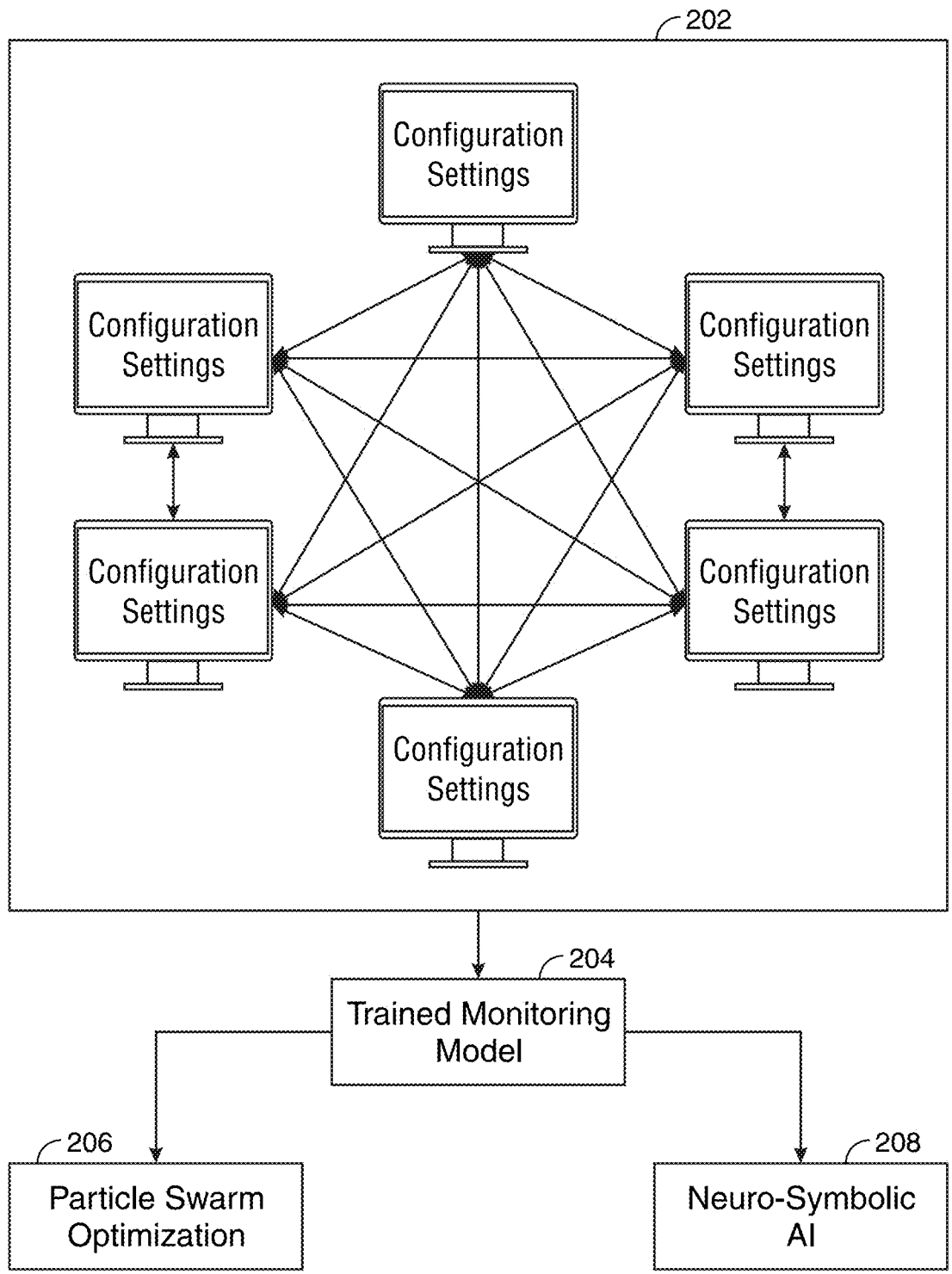
FIG. 2 shows an illustrative diagram in accordance with principles of the disclosure.

FIG. 2 shows a blockchain network 202 in accordance with principles of the disclosure. Blockchain network 202 may include a plurality of nodes in electronic communication.

Each node may have node configuration settings. The node configuration settings may be unique for each node. The node configuration settings may be the same and/or substantially similar to all the nodes.

Blockchain network 202 may include a trained monitoring model 204. Trained monitoring model 204 may be a ML model trained to identify possibilities of configuration drifts occurring at one or more nodes in the blockchain network.

Trained monitoring model 204 may leverage particle swarm optimization models 206 and neuro-symbolic AI 208 for identifying the configuration drifts and remediating the changes occurring at the nodes that may cause the configuration drift.

Figure 3A:
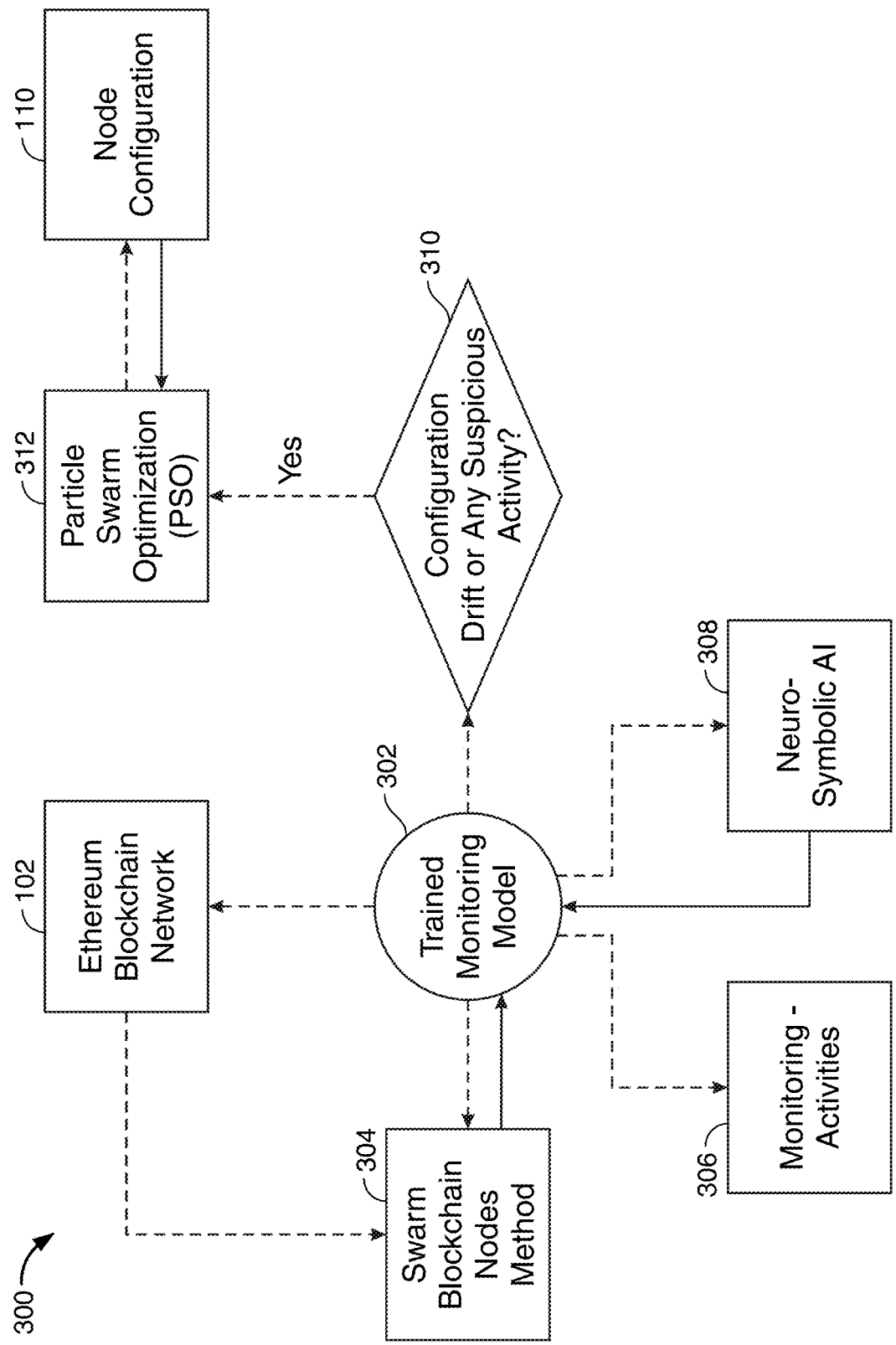
FIG. 3A shows an illustrative system architecture in accordance with principles of the disclosure.

FIG. 3A shows a system architecture 300 for detecting and remediating configuration drifts in accordance with principles of the disclosure.

System architecture 300 may include blockchain network 102. Blockchain network 102, in this exemplary diagram may be an Ethereum blockchain network. System architecture 300 may include exemplary node configuration settings 110.

System architecture 300 may include a trained monitoring model 302. Trained monitoring model 302 may leverage PSO model 312 and neuro-symbolic AI 308 for identifying and remediating configuration drifts on the blockchain network.

System architecture 300 may include swarm blockchain nodes method 304. Swarm blockchain nodes method 304 may leverage a swarm of nodes to identify changes in node behaviors and settings and assess the impact of the changes to the block, the nodes and the blockchain network.

System architecture 300 may monitor one or more activities executed by one or more nodes, as shown at 306. The trained monitoring model may monitor types of activities displayed at 306 for changes that may cause a configuration drift in the blockchain network.

System architecture 300 may include a PSO model 312 for detecting configuration drifts on one or more nodes. The PSO model 312 may be configured to analyze the configuration settings in order to identify a configuration drift.

System architecture 300 may include a neuro-symbolic AI model 308 for remediating configuration drifts and generating additional remediation rules for training the trained monitoring model 302. Neuro-symbolic AI model 308 may be a model that executes an algorithm for identifying a pattern from a configuration drift. Neuro-symbolic AI model 308 may be configured to determine whether the drift may have a significant security implication on the blockchain network.

Neuro-symbolic AI model 308 may be configured to generate one or more remediation rules using the neuro-symbolic AI algorithm and either isolate the node or a subset of the node or automatically initiate a healing method.

Figure 3B:
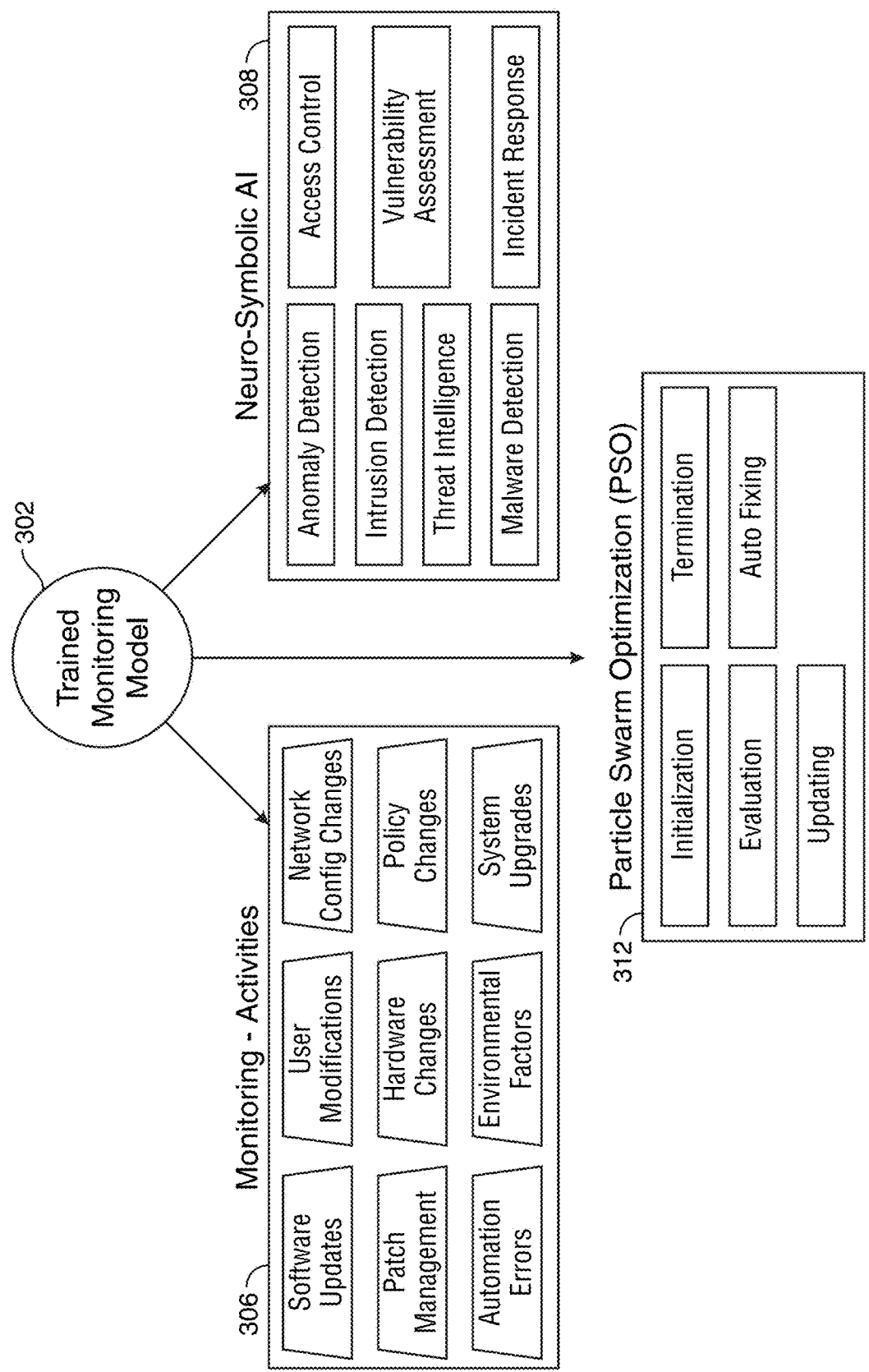
FIG. 3B shows an illustrative diagram in accordance with principles of the disclosure.

FIG. 3B shows a subset of the system architecture shown in FIG. 3A. Trained monitoring model 302 may leverage PSO model 312 and neuro-symbolic AI 308 for identifying and remediating configuration drifts on the blockchain network.

At 306, trained monitoring model 302 may monitor activities performed at one or more nodes on the blockchain network. Activities that may require monitoring for deviations may include software updates, user modifications and network configuration settings. Additional activities may include patch management, hardware changes, policy changes, automation errors, environmental factors, system upgrades, and any other suitable node activity.

Neuro-symbolic AI 308 may be leveraged by trained monitoring model 302 for detecting and remediating the configuration drifts. Neuro-symbolic AI 308 may be enabled to detect anomalies, intrusion, threats, malware and access control. Neuro-symbolic AI 308 may be enabled to perform a vulnerability assessment and may be enabled to execute responses to incidents that may be identified via neuro-symbolic AI 308.

PSO model 312 may be leveraged by trained monitoring model for identifying the configuration drifts within the blockchain network. PSO model 312 may include a plurality of steps for identifying and detecting a drift. The steps may include initialization, evaluation, updating, termination and auto fixing.

Figure 4:
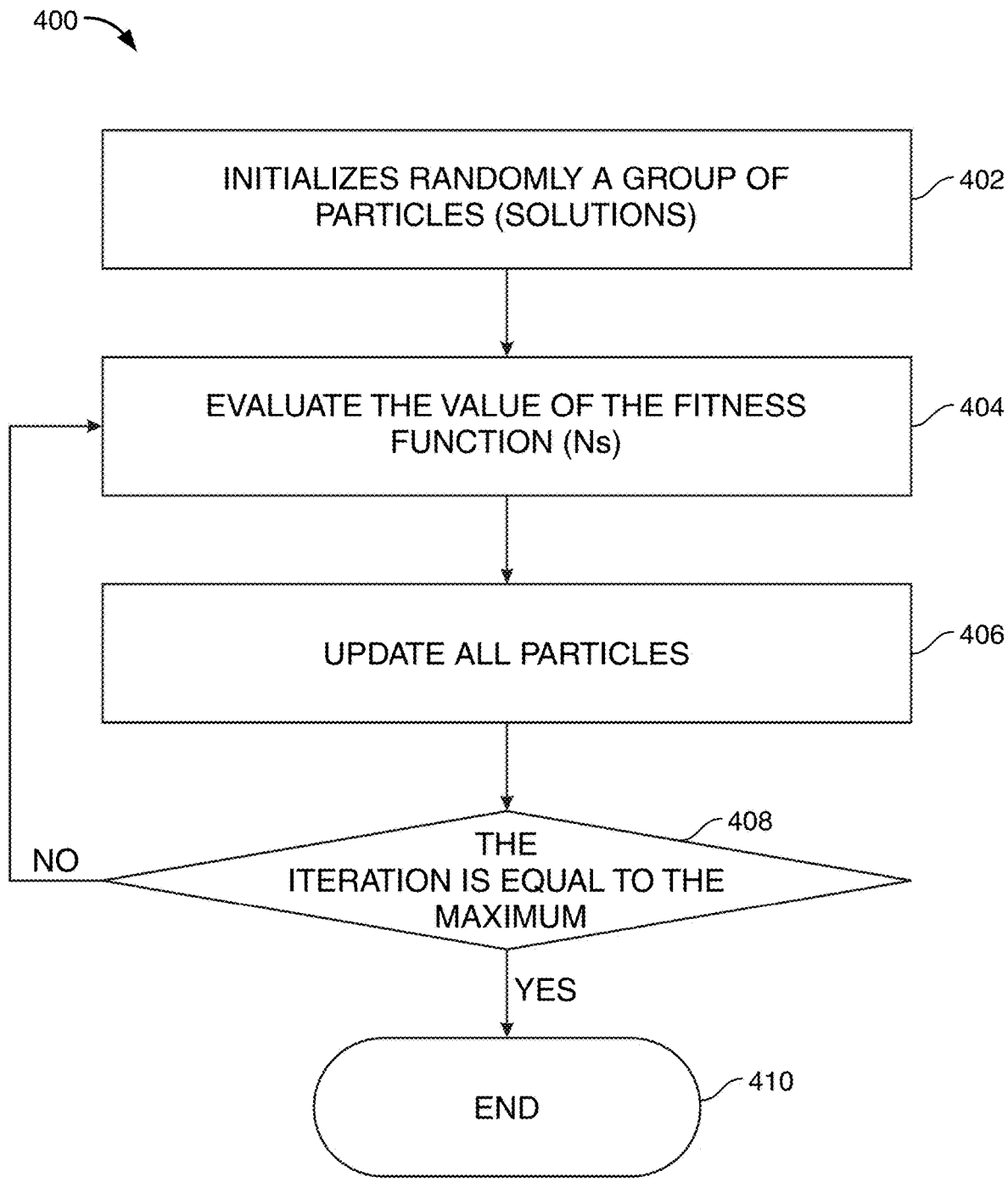
FIG. 4 shows illustrative exemplary flow diagram in accordance with principles of the disclosure.

FIG. 4 shows an exemplary flow diagram 400. The flow diagram 400 may be a PSO algorithm for identifying configuration drifts on a node.

At 402, the step may include initializing randomly a group of particles. Particles, for the purpose of the disclosure, may be referred to herein as nodes. For each node, the node configuration settings may be initialized for being monitored. The node settings may be monitored at a central server.

At step 404, the step may include evaluating the value of the fitness function. The health of the node may be evaluated based on predefined criteria related to the network configurations. This may include measuring the stability, security and performance of the network under the current node configuration settings.

The PSO algorithm may be enabled to detect deviations or changes in the network configuration settings. These deviations may indicate configuration drifting within the blockchain network.

At step 406, upon detecting configuration drifts, the PSO algorithm may update all particles. The PSO algorithm may trigger corrective actions to mitigate the drifts. The corrective actions may include adjusting the current node configuration settings to align with the required node configuration settings. The corrective actions may include implementing security measures and/or reconfiguring nodes to restore the stability and integrity of the network.

At step 408, the PSO algorithm may iterate multiple times to monitor the configuration settings for each node. The PSO algorithm may leverage the swarm of nodes for identifying when a deviation may occur. When the iterating is equal to a maximum, the PSO algorithm may end the monitoring for the configuration settings initialized at step 402. The iterating may be equal to the maximum when it is determined that the algorithm has effectively identified and remediated the configuration drift.

Figure 5:
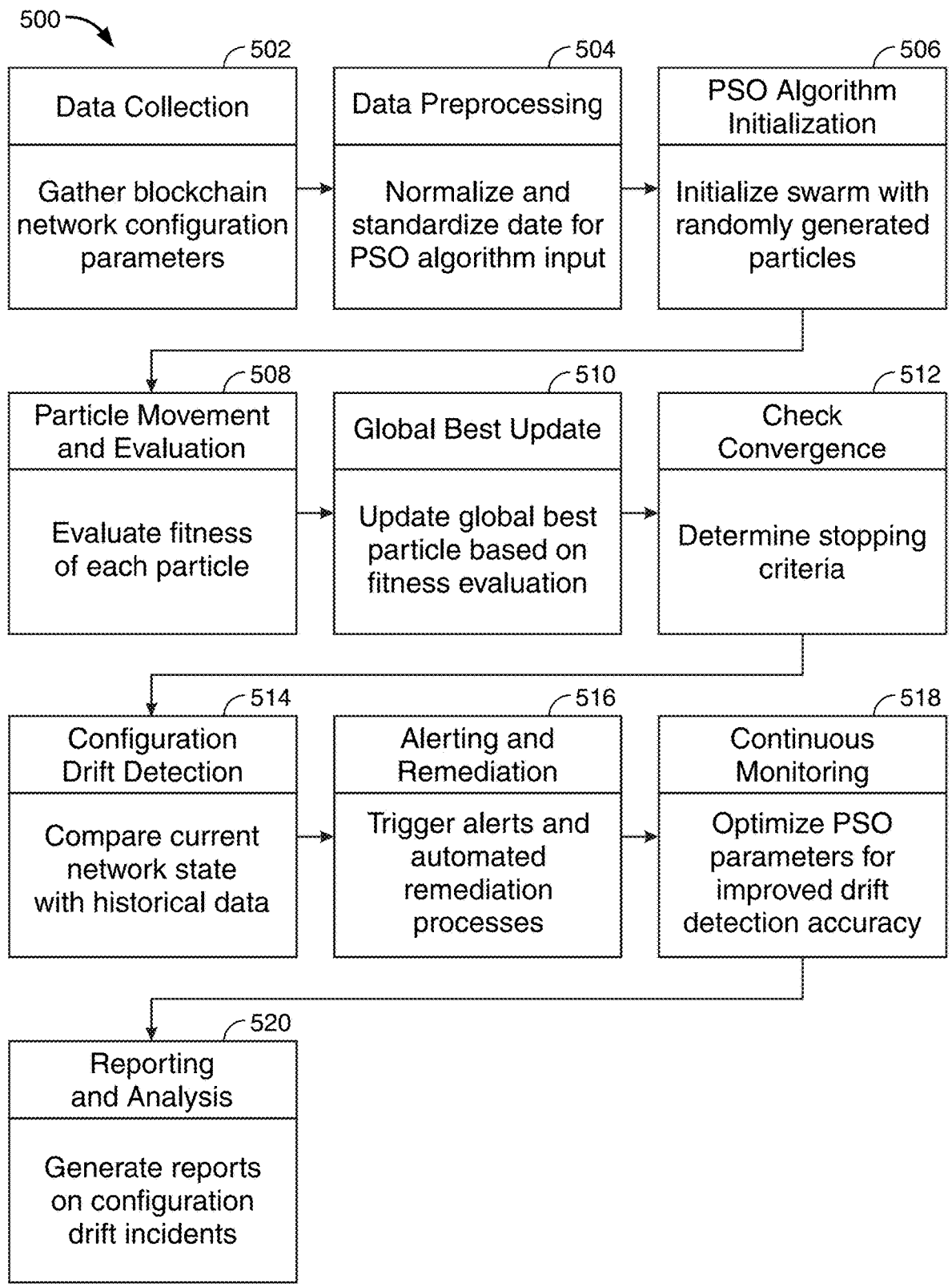
FIG. 5 shows an illustrative exemplary diagram in accordance with principles of the disclosure.

FIG. 5 shows an illustrative flow diagram 500 for identifying configuration drifts and the process for remediating the drifts.

At 502, the system may be configured to retrieve configuration settings from each of the nodes. By gathering the settings from each node, the system may be enabled to leverage swarm intelligence based on all data received from each node to assist in identifying the drifts that may occur.

At 504, the system may normalize and standardize the data received from each node for a seamless processing of the data using the PSO algorithm.

At 506, the system may execute the PSO algorithm for initializing the swarm with randomly generated particles. The particles may be a select group of nodes. The particles may include a plurality of configuration settings for each of the select group of nodes.

At 508, the system may evaluate the fitness of each particle. The fitness of each particle may be evaluated based on predefined criteria associated with the node configurations. Each particle may be a node in the blockchain network.

At 510 the system may update the particle based on fitness evaluation. The particle may be the node where a drift may be identified.

At 512, the system may determine predetermined criteria for ending the evaluating on the settings received from the group of nodes.

At 514, the system may detect a configuration drift during the monitoring and compare the current network configuration settings to historical data. The historical data may include the required node configuration settings. The historical data may include node activity history occurring within a predetermined time window prior to the detecting.

At 516, the system may trigger an alert of a configuration drift to all nodes on the network. The system may further execute an automated remediation process.

At 518, the system may continuously monitor the node configuration settings, optimize the settings and parameters for each node and feed updates to the trained monitoring model for subsequent monitoring and remediation.

At 520, the system may generate reports and an analysis review on configuration drifts that occurred. These reports may be analyzed by users for improving the system.

Figure 6:
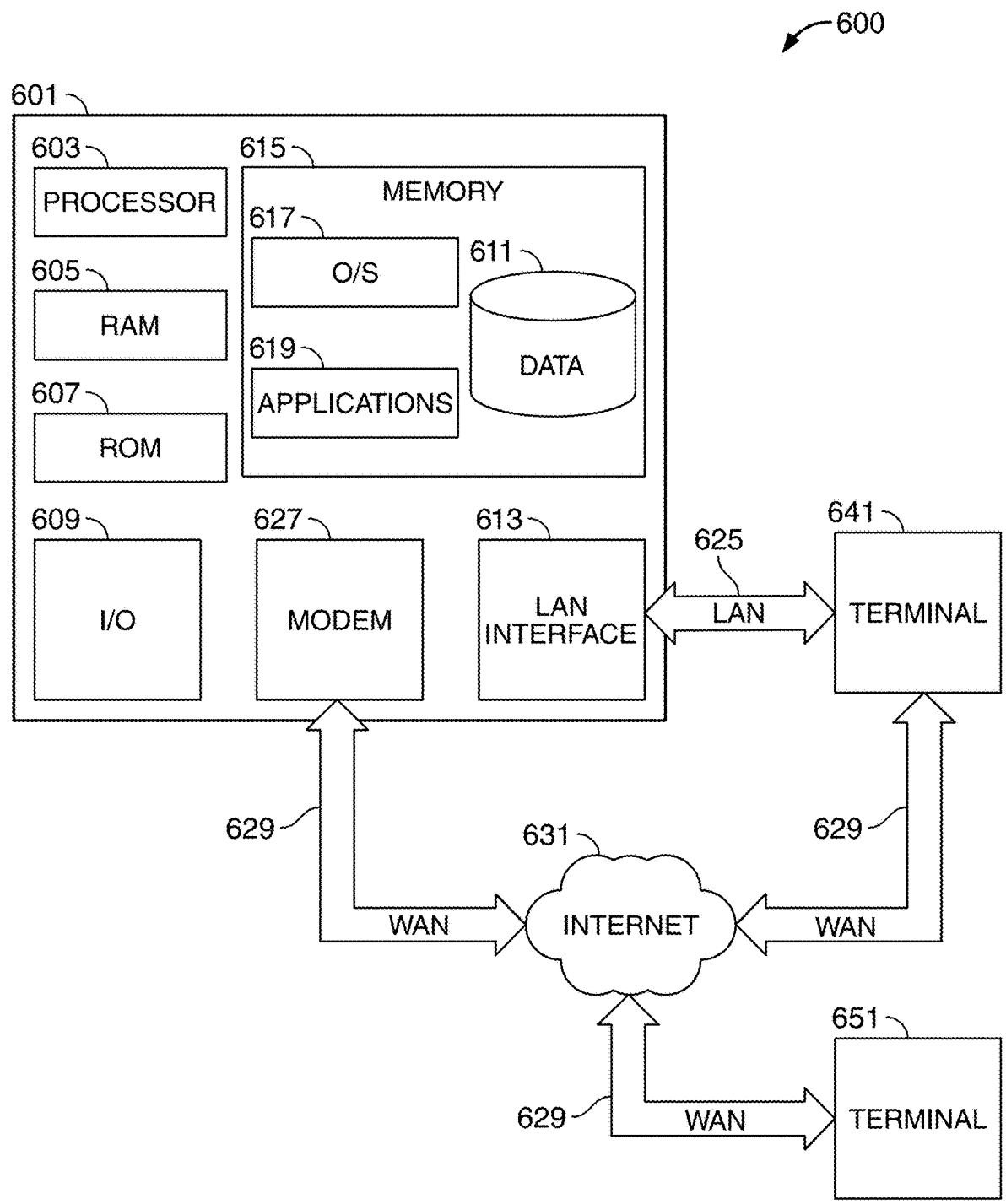
FIG. 6 shows an illustrative block diagram in accordance with principles of the disclosure.

FIG. 6 shows an illustrative block diagram of system 600 that includes computer 601. Computer 601 may alternatively be referred to herein as an "engine," "server" or a "computing device." The computing system may include one or more computer servers 601. Computer 601 may be any computing device described herein. Computer 601 may include each of the plurality of nodes included in the blockchain network, the blockchain server, the central server and any other computing device described herein. Computer 601 may include the communications server. Elements of system 600, including computer 601, may be used to implement various aspects of the systems and methods disclosed herein.

Computer 601 may have a processor 603 for controlling the operation of the device and its associated components, and may include RAM 605, ROM 607, input/output circuit 609, and a non-transitory or non-volatile memory 615. Machine-readable memory may be configured to store information in machine-readable data structures. Other components commonly used for computers, such as EEPROM or Flash memory or any other suitable components, may also be part of the computer 601.

The memory 615 may be comprised of any suitable permanent storage technology—e.g., a hard drive. The memory 615 may store software including the operating system 617 and application(s) 619 along with any data 611 needed for the operation of computer 601. Memory 615 may also store videos, text, and/or audio assistance files. The data stored in Memory 615 may also be stored in cache memory, or any other suitable memory.

Input/output ("I/O") module 609 may include connectivity to a microphone, keyboard, touch screen, mouse, and/or stylus through which input may be provided into computer 601. The input may include input relating to cursor movement. The input/output module may also include one or more speakers for providing audio output and a video display device for providing textual, audio, audiovisual, and/or graphical output. The input and output may be related to computer application functionality.

Computer 601 may be connected to other systems via a local area network (LAN) interface 613. Computer 601 may operate in a networked environment supporting connections to one or more remote computers, such as terminals 641 and 651. Terminals 641 and 651 may be personal computers or servers that include many or all of the elements described above relative to computer 601.

When used in a LAN networking environment, computer 601 is connected to LAN 625 through a LAN interface 613 or an adapter. When used in a WAN networking environment, computer 601 may include an environment 627 or other means for establishing communications over WAN 629, such as Internet 631.

In some embodiments, computer 601 may be connected to one or more other systems via a short-range communication network (not shown). In these embodiments, computer 601 may communicate with one or more other terminals 641 and 651, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 619, which may be used by computer 601, may include computer executable instructions for invoking functionality related to communication, such as e-mail, Short Message Service (SMS), and voice input and speech recognition applications. Application program(s) 619 (which may be alternatively referred to herein as "plugins," "applications," or "apps") may include computer executable instructions for invoking functionality related to performing various tasks. Application programs 619 may utilize one or more algorithms that process received executable instructions, perform power management routines or other suitable tasks. Application programs 619 may include any one or more of the applications embedded within the PSO model and the neuro-symbolic AI model, and instructions and algorithms associated with and/or embedded within the trained monitoring model.

Application program(s) 619 may include computer executable instructions (alternatively referred to as "programs"). The computer executable instructions may be embodied in hardware or firmware (not shown). The computer 601 may execute the instructions embodied by the application program(s) 619 to perform various functions.

Application program(s) 619 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 619 may include one or more algorithms that may be used to implement features of the disclosure.

The invention may be described in the context of computer-executable instructions, such as applications 619, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 601 and/or terminals 641 and 651 may also include various other components, such as a battery, speaker, and/or antennas (not shown). Components of computer system 601 may be linked by a system bus, wirelessly or by other suitable interconnections. Components of computer system 601 may be present on one or more circuit boards. In some embodiments, the components may be integrated into a single chip. The chip may be silicon-based.

Terminal 651 and/or terminal 641 may be portable devices such as a laptop, cell phone, Blackberry™, tablet, smartphone, or any other computing system for receiving, storing, transmitting and/or displaying relevant information. Terminal 651 and/or terminal 641 may be one or more user devices. Terminals 651 and 641 may be identical to computer 601 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 7:
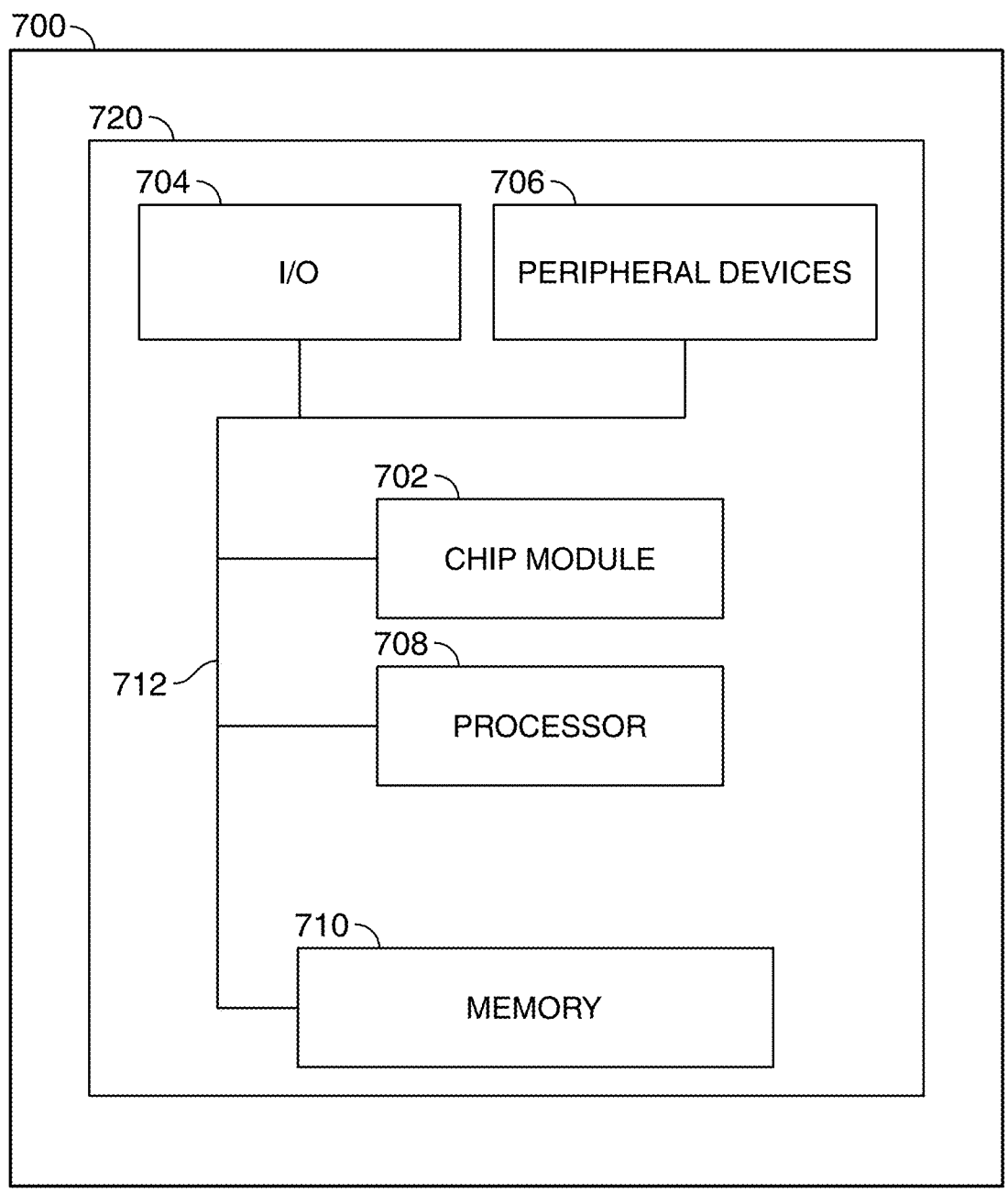
FIG. 7 shows an illustrative apparatus that may be configured in accordance with principles of the disclosure.

FIG. 7 shows illustrative apparatus 700 that may be configured in accordance with the principles of the disclosure. Apparatus 700 may be a computing device. Apparatus 700 may include chip module 702, which may include one or more integrated circuits, and which may include logic configured to perform any other suitable logical operations.

Apparatus 700 may include one or more of the following components: I/O circuitry 704, which may include a transmitter device and a receiver device and may interface with fiber optic cable, coaxial cable, telephone lines, wireless devices, PHY layer hardware, a keypad/display control device or any other suitable media or devices; peripheral devices 706, which may include counter timers, real-time timers, power-on reset generators or any other suitable peripheral devices; logical processing device 708, which may compute data structural information and structural parameters of the data, and machine-readable memory 710.

Machine-readable memory 710 may be configured to store in machine-readable data structures: machine executable instructions, (which may be alternatively referred to herein as "computer instructions" or "computer code"), applications such as applications 619, signals, and/or any other suitable information or data structures.

Components 702, 704, 706, 708 and 710 may be coupled together by a system bus or other interconnections 712 and may be present on one or more circuit boards such as circuit board 720. In some embodiments, the components may be integrated into a single chip. The chip may be silicon-based.

Thus, systems and methods for detecting and remediating configuration drifts in blockchain nodes is provided. Persons skilled in the art will appreciate that the present invention can be practiced by other than the described embodiments, which are presented for purposes of illustration rather than of limitation.

What is claimed is:

1. A system for detecting and remediating configuration drifts in blockchain nodes, the system comprising:
 a blockchain network comprising a plurality of nodes in electronic communication, each node having required node configuration settings; and
 a trained monitoring model configured to monitor activities at each of the plurality of nodes to identify, for each node, a configuration drift to a required node configuration setting, the trained monitoring model configured to:
  in response to identifying the configuration drift on a node, the configuration drift being a deviation between a current node configuration setting and the required node configuration setting, determine whether an impact level of the configuration drift to the blockchain network is greater than a pre-determined threshold value, the impact level being determined along a predetermined scale of values, the pre-determined threshold value being a selected one of the predetermined scale of values;
  when the impact level is greater than the pre-determined threshold value:
   electronically communicate with each of the plurality of nodes to temporarily isolate the node comprising the deviation, the temporary isolation including deleting any data received from the node; and
   execute a two-tier remediation routine to auto-heal the node and blocks stored on the node, the two-tier remediation routine comprising:
    overwriting the current node configuration setting with the required node configuration setting; and
    following the overwriting, regenerating each block stored on the node during a predetermined time period prior to the identifying of the configuration drift; and
   following the executing of the two-tier remediation routine, de-isolate the node;
   relink the node to the blockchain network, the relinking comprising:
    increasing, by increments, an operation of the node from a first operational level to a target operational level;
    monitoring the node at each incremented level to determine whether a configuration drift is occurring, the monitoring for a predetermined time period following the de-isolating; and
    in an event that another configuration drift is identified at the node and the impact level is greater than the pre-determined threshold value, permanently remove the node from the blockchain network; and
  when the impact level is less than the pre-determined threshold value, continuously monitor activity at the node.

2. The system of claim 1 wherein each increment for increasing of the operation of the node is an increase of a ten percent operational level.

3. The system of claim 1 wherein each increment for increasing of the operation of the node is an increase of a twenty percent operational level.

4. The system of claim 1 wherein the target operational level is an operation of the node at a maximum operational level.

5. The system of claim 1 wherein the impact level corresponds to a magnitude of the deviation between the current node configuration setting and the required node configuration setting.

6. The system of claim 5 wherein the magnitude of the deviation between the current node configuration setting and the required node configuration setting is five percent or greater.

7. The system of claim 5 wherein the magnitude of the deviation between the current node configuration setting and the required node configuration setting is between five and ten percent.

8. The system of claim 1 wherein each node comprises a blockchain server and the trained monitoring model is running on each blockchain server.

9. The system of claim 1 wherein the trained monitoring model is running on a central server and each node transmits each current node configuration setting to the central server.

10. The system of claim 9 wherein the trained monitoring model is configured to evaluate current node configuration settings for each node based on a predefined criteria and when one or more current node configuration settings is a mismatch to the predefined criteria, the trained monitoring model is configured to identify the mismatch as the configuration drift.

11. The system of claim 10 wherein the trained monitoring model uses a combination of the current node configuration settings from each node transmitted to the central server for identifying the mismatch.

12. The system of claim 1 wherein the configuration drift is detected in response to a lack of performing a software update on the node.

13. The system of claim 1 wherein the configuration drift is detected in response to a lack of clock synchronization between the node and the plurality of nodes.

14. The system of claim 1 wherein the configuration drift is a difference between the required node configuration settings and the current node configuration settings.

15. The system of claim 1 wherein when the overwriting fails to remediate the configuration drift, the trained monitoring model is configured to execute a neuro-symbolic artificial intelligence ("AI") model to generate a remediation rule for the configuration drift, the generating comprising:
 analyzing the configuration drift using the neuro-symbolic AI model to determine a pattern leading to an onset of the configuration drift; and
 based on the pattern leading to the onset, generating the remediation rule for detecting and remediating the configuration drift.

16. The system of claim 15 wherein the pattern leading to the onset is determined by:
 comparing the current node configuration settings to the required node configuration settings during a pre-determined time window prior to the onset;
 based on the comparing, determining a deviation between the current node configuration settings and the required node configuration settings;

identifying a trigger to a cause of the configuration drift, the configuration drift being based on the deviation;

based on the trigger, generating the remediation rule for detecting the trigger;

executing the remediation rule for remediating the configuration drift; and feeding the remediation rule to the trained monitoring model for subsequent monitoring and remediating.

17. The system of claim 1 wherein, when in response to the monitoring the configuration drift is not identified, the trained monitoring model is configured to monitor activities at each of the plurality of nodes.

18. A method for detecting and remediating configuration drifts occurring within a blockchain network, the method comprising:

monitoring activities at each of a plurality of nodes to identify a configuration drift to a current node configuration setting for each node, each node having a corresponding required node configuration setting, each node being part of a blockchain network;

in response to identifying a configuration drift on a node, the configuration drift being a deviation between a current node configuration setting and the required node configuration settings, determining whether an impact level of the configuration drift to the blockchain network is greater than a pre-determined threshold value; and when the impact level is less than the pre-determined threshold value, continuously monitoring activity at the node; and when the impact level is greater than the pre-determined threshold value:

electronically communicating with each of the plurality of nodes to temporarily isolate the node comprising the deviation, the temporary isolation including deleting any data received from the node; and executing a two-tier remediation routine to auto-heal the node and blocks stored on the node, the two-tier remediation routine comprising:

overwriting the current node configuration setting with the required node configuration setting; and following the overwriting, regenerating each block stored on the node during a predetermined time period prior to the identifying of the configuration drift;

following the executing of the two-tier remediation routine, de-isolating the node; and relinking the node to the blockchain network, the relinking comprising:

increasing, by increments, an operation of the node from a first operational level to a target operational level;

monitoring the node at each incremented operational level to determine whether a configuration drift is occurring, the monitoring for a predetermined time period following the de-isolating; and in an event that another configuration drift is identified at the node and the impact level is greater than the pre-determined threshold value, permanently remove the node from the blockchain network.

19. The method of claim 18 wherein each increment for increasing of the operation of the node is an increase of a ten percent operational level.

20. The method of claim 18 wherein each increment for increasing of the operation of the node is an increase of a twenty percent operational level.

* * * * *